United States Patent [19]

Shah

[11] 4,324,689
[45] Apr. 13, 1982

[54] HIGH CARBON CONTENT CHROMATOGRAPHIC PACKING AND METHOD FOR MAKING SAME

[76] Inventor: Ramesh M. Shah, 3028 Lehigh Ct., Indianapolis, Ind. 46268

[21] Appl. No.: 124,711

[22] Filed: Feb. 26, 1980

[51] Int. Cl.$^3$ .................. B01J 20/30; B01J 20/22; B01D 15/08
[52] U.S. Cl. ................................. 252/428; 210/198.2
[58] Field of Search ............... 252/430, 428, 449, 317; 423/338; 55/67, 386; 210/198 C, 198.2, 656; 427/220

[56] References Cited

U.S. PATENT DOCUMENTS

| | | | |
|---|---|---|---|
| 2,614,135 | 10/1952 | Hirschler | 252/451 |
| 3,722,181 | 3/1973 | Kirkland | 252/430 |
| 3,956,179 | 5/1976 | Sebestian et al. | 252/428 |
| 3,984,349 | 10/1976 | Meiller et al. | 252/428 |

OTHER PUBLICATIONS

Howard, G.A. et al., The Separation of the $C_{12}$–$C_{18}$ Fatty Acids by Reversed-phase Partition Chromatography, Biochem. J., vol. 46, 1950, pp. 532–538.
Majors, R. E. et al., Studies of Siloxane Phases Bonded to Silica Gel for Use in High Performance Liquid Chromatography, J. Chromatog., vol. 12, 1974, pp. 767–778.
Kingston, David et al., Preliminary investigation of the use of high-pressure liquid chromatography for the separation of indole alkaloids, J. Chromatog., vol. 104, 1975, pp. 431–437.
Kingston, David et al., Preparation of octadecyl Porasil for reversed-phase liquid chromatography, J. Chromatog., vol. 116, 1976, pp. 182–183.
Scott, R. P. W. et al., Examination of Five Commercially Available Liquid Chromatographic Reversed Phases (Including Nature of the Solute-Solvent-Stationary Phase Interactions Associated with Them), J. Chromatog., vol. 142, 1977, pp. 213–232.

Primary Examiner—P. E. Konopka
Attorney, Agent, or Firm—Fisher, Christen & Sabol

[57] ABSTRACT

A reverse-phase chromatographic packing having a carbon content of over 20% by weight is prepared by hydrolyzing silica gel with a mixture of sulfuric and nitric acid, washing the treated silica gel and drying it, reacting the hydrolyzed silica gel with an alkylchlorosilane, washing the product, and drying it all under conditions which maintain a moisture content in the silica.

12 Claims, No Drawings

HIGH CARBON CONTENT CHROMATOGRAPHIC PACKING AND METHOD FOR MAKING SAME

BACKGROUND

Column chromatography has long been known as an accepted analytical method by which separation of the solutes of a liquid sample is made possible. A recent development known as High Performance Liquid Chromatography (H.P.L.C.) has introduced a new concept of separating the solutes of the sample with high speed and with near predictable performance.

As in all chromatography, separation of the solutes of the sample using 'Reversed-Phase' (RP) is accomplished with high speed; in a fraction of the time usually required; with the capability of separating polar/non-polar ionic solutes many times on a single column using a simple mobile phase. Also, the reversed-phase columns, with proper use, can give long service.

The term 'Reverse-Phase' was referred to by Howard et al (Biochem. J., vol. 46, 1950). The 'Reversed' term is pertinent since in 'Normal' phase partition chromatography the stationary phase is polar and the mobile phase is non-polar, while in the 'Reversed-Phase' chromatography, the stationary phase is non-polar and the mobile phase is polar. Thus, the polarity relationship is reversed. The mechanism assumed to account for this is the binding of the solutes to the functional groups of the hydrocarbon chains at the surface of the stationary phase in such a way that the binding forces vary in strength depending upon the nature of the solute-functional group interaction. The most commercial bonded 'Reversed-phase' media, silica gel is reacted with an organic chlorosilane, i.e. the hydrocarbon moiety is covalently bonded to the silica surface as Si—O—Si—R, where R=alkyl chain, the most common being $C_{18}$.

All 'Reversed-phase' HPLC does not use the $C_{18}$ chain. Scott et al (J. Chromatog., vol. 142, 1977) pointed out that packing media having carbon chains of the same length can be very different chromatographically. In general, the solute retention is directly proportional to the chain length of the packing media i.e. the retentive capacity is greater for longer chains and also the column stability is greater for longer chain phases (Majors et al., J. Chromatog., vol. 12, 1974; and Kingston et al., J. Chromatog., vol. 104, 1975; and vol. 116, 1976). Also, the retentive capacity depends on the carbon content of the 'Reversed-phase' packing media. The carbon content is the percentage of carbon (w/w) of the alkyl chain containing silica, e.g. octadecyl-silica, based on the weight of the alkyl chain. The carbon content refers to the interacting functional groups, the alkyl chains. The unreacted hydroxyl groups give the stationary phase polar characteristics and therefore selectively depends in part upon the extent of silanization. The carbon content is, for chromatographic purposes, distinguished from derivatization (surface coverage, % silanization). Derivatization is defined as the percentage of the available hydroxyl groups of the silica gel reacted with the silane.

The procedure described by Kingston et al. (J. Chromatog., vol. 116, 1976) provides Silica-$C_{18}$ having 11.21 percent carbon content.

OBJECTS OF THE INVENTION

One of the objects of the present invention is to prepare a consistently high carbon content silanized silica gel of about 20%. Another object is to produce a high carbon content silanized silica gel which can be used for difficult separations in 'reverse-phase' chromatography. A further object is to produce a high carbon content silanized silica gel which will permit separation of the maximum amount of sample without loss of resolution. A still further object is to prepare a high carbon content silanized silica gel which can be reused several times as a packing without loss of resolution. An additional object is to prepare a high carbon content silanized silica gel which can be readily regenerated for reuse. Another object of the present invention is to prepare a high carbon content silanized silica gel which can be used for 'reverse-phase' chromatography at low pressures and at high pressures without loss in resolution.

BRIEF SUMMARY OF THE INVENTION

A 'reverse-phase' chromatographic packing consistently having a carbon content of at least 20% by weight is prepared by hydrolyzing silica gel by treating the silica gel with a mixture of sulfuric and nitric acids, washing the treated silica gel to remove the acids, drying the treated silica gel, silanizing the hydrolyzed silica gel by reacting it with an alkylchlorosilane, washing the resulting product, and drying it, said hydrolysis and said silanization occurring at a temperature which does not exceed 100° C., the acid hydrolysis and the silanization through the drying steps being conducted so as to maintain a moisture content of between about 5.5% to 9.5%, preferably between about 7.5% to 8.5% water by weight of the silica gel. The presence of moisture during the hydrolysis phase and the silanization phase is necessary to keep the bonding sites in the silica open for reaction with the alkylchlorosilane. If the silica is completely dried, then the bonding sites become unavailable for reaction with the alkylchlorosilane. Complete drying of the silica gel results in a product of lower carbon content.

DETAILED DESCRIPTION OF THE INVENTION

In the present invention a 'reverse-phase' chromatographic packing having a carbon content of at least 20% by weight is produced by hydrolyzing silica gel, silanizing the silica gel with an alkylchlorosilane, and hydrolyzing the bonded cholorosilane to replace chlorine atoms of the bonded chlorosilane with hydroxyl groups.

In the acid hydrolysis phase of the process of the present invention a mixture of sulfuric and nitric acids is admixed with silica gel. The particle size of the silica gel is not critical and can be up to about 60 microns. A particle size of 5 to 10 microns however, is preferred.

The weight percentages of sulfuric acid and nitric acid in the acid mixture is preferably about 50% concentrated sulfuric acid and about 50% concentrated nitric acid. The acid mixture must be of sufficient strength to provide an exothermic reaction upon admixture with the silica gel. Suitable concentrations are 40% to 60% sulfuric acid by weight admixed with 40% to 60% by weight nitric acid, the total weight percentage adding up to 100%. Other strong acids, such as hydrochloric acid have been found to interfere with the silanization phase and are not suitable.

The reaction temperature during the acid hydrolysis must not exceed 100° C. Temperatures in excess of 100° C. result in a depletion of the moisture content of the silica gel. Traces of moisture are necessary to preserve the bonding sites in the silica for reaction with the alkylchlorosilane. If the silica is completely dried, then the bonding sites become unavailable for reaction with the chlorosilane. As a result, products of lower carbon content are obtained. A typical reaction temperature and time for the hydrolysis phase is between 90° C. to 100° C. for about 16 hours.

After the heating step, the silica gel is filtered to remove the acid solution and the silica gel is then repeatedly washed with a water solution to remove residual acids. The initial pH of the wash solution should be at least equal to 6. The washing is repeated until the final wash solution has a pH substantially equal to the pH of the initial wash. Deionized water is preferably used as the wash solution. After the water wash, the silica gel is washed with a $C_1$ to $C_4$ alcohol, preferably methanol. The alcohol wash serves to remove traces of nitric acid which imparts a yellow color to the silica. After the methanol wash, an acetone wash can be used to remove traces of methanol and to speed up the subsequent drying step. While the alcohol and acetone washes remove water from the silica gel, the traces of moisture which are necessary to preserve the bonding sites for subsequent reaction with the alkylchlorosilane remain.

The washed silica gel is then dried so as to maintain a water content of between about 5.5% to 9.5%, preferably between about 7.5% to 8.5% water by weight of the silica gel. The drying can occur over night at room temperature. Preferably, the drying occurs under vacuum at a temperature of about 60° C. A drying temperature however, between about 55° C. to 65° C. has been found to be suitable. The pressure during the vacuum drying is typically about 25 pounds per sq. inch to about 27 pounds per sq. inch on a conventional pressure gauge.

The hydrolyzed silica is then reacted with the alkylchlorosilane. The reaction temperature must not exceed 100° C. so as to maintain a water content in the silica to preserve the bonding sites for reaction with the alkylchlorosilane. The amount of silane used is typically between 3.5 weight percent and 3.7 weight percent alkylchlorosilane based on the weight of the hydrolyzed silica. Typical of the alkylchlorosilane reactants useful in the present invention are the $C_1$ and $C_{18}$ alkylchlorosilanes. Examplary of the alkylchlorosilanes are dimethyldichlorosilane, trimethylchlorosilane, t-butylmethylchlorosilane, and $C_1$ to $C_{18}$ alkyltrichlorosilanes such as n-hexyltrichlorosilane, n-dodecyltrichlorosilane, and n-octadecyltrichlorosilane. The preferred alkylchlorosilane is n-octadecyltrichlorosilane and the most preferred is n-hexyltrichlorosilane. The hydrolyzed silica and the alkylchlorosilane are typically reacted for approximately 16 hours at a reaction temperature of about 90° C. to 100° C. Longer reaction times and lower reaction temperatures however, can be used as long as traces of moisture are present to preserve the bonding sites in the silica for reaction with the alkylchlorosilane.

The silanization reaction mixture is then filtered to separate the silica from the solvent mixture. The separated silica is then repeatedly washed in an organic solvent such as toluene to remove traces of the reaction mixture. At this point, it is preferable to block dry a small portion of the silanized product and then analyze it to determine if its carbon content is at an acceptable high level. This step serves to detect if any processing errors occurred during the acid hydrolysis step and/or the silanization step which result in an insufficient moisture content in the silica gel. Reaction temperatures above 100° C. during the acid hydrolysis step and/or the silanization step or too much drying prior to the silanization step depletes the moisture content and results in final products having lower carbon contents. If a low carbon content is detected, then the hydrolyzed silica is again subjected to the silanization reaction. However, a lesser amount (about 40-60% by weight) of the alkylchlorosilane is used than was used in the first silanization. The twice-silanized product is then filtered and washed to remove traces of the reaction as was done after the first silanization.

Whether there is only one silanization step or more than one silanization step, after the silanized product is washed to remove traces of the silanization reaction mixture the silanized product is then separately washed in methanol and acetone to improve the color of the silica and to facilitate subsequent drying as described above in connection with the hydrolysis phase.

The washed silica is then dried as in the acid hydrolysis phase so as to maintain a water content in the silica of between about 5.5% to 9.5%, preferably between about 7.5% water by weight to about 8.5% water by weight based upon the weight of the silica gel. Drying at the reduced temperatures and pressures of the present invention permits moisture to remain in the silica and facilitates bonding of the carbon chain of the alkylchlorosilane in higher proportions so as to result in the consistently high carbon content of the products of the present invention. If the silica is dried to completion, the carbon content of the product drops to conventional levels of 10 to 11 percent.

The silanized dried silica is then hydrolyzed to replace the chlorine atoms of the bonded alkylchlorosilane with hydroxyl ions. The hydrolysis is achieved by mixing the silanized dried silica with aqueous acetonitrile (about 40% to 60% by volume) and stirring at room temperature. The solution is then decanted off and the silica is sequentially washed with water and acetone to remove traces of the acetonitrile reaction solution. Once the silanized dried silica is hydrolyzed, maintaining a moisture content in the silanized, hydrolyzed silica is no longer critical. The silica is then dried as in the acid hydrolysis and silanization drying steps. Typically, the moisture content of the final dried product is between about 5.0% water by weight to about 6.5% water by weight based upon the weight of the silica gel. The product however, can be dried to a moisture content of about 1.0% or less, by weight, based upon the weight of the silica gel.

The invention is illustrated but not limited by the following examples in which proportions are by weight unless otherwise indicated.

EXAMPLE 1

A mixture of 1000 ml. each of concentrated sulfuric acid and concentrated nitric acid are introduced in a 5 liter round bottom flask and permitted to cool. 500 grams of pure silica gel are slowly added to the concentrated acid mixture, and the flask is gently swirled until all the silica is properly suspended. A circulating water condensor is attached to the flask and the mixture is heated at a reaction mixture temperature of 90-100° C. on a steam bath. Thereafter, the flask is removed from the steam bath and the mixture is permitted to cool. The cooled acid is run through a glass filter. The silica is suspended in 10 liters of deionized water, stirred and permitted to settle. The acidic water is decanted and the silica is washed ten consecutive times using 10 liters of deionized water each wash. The suspended silica is stirred and permitted to settle. The pH of the final wash is checked to make certain that its pH is approximately that of the deionized wash water; namely, about ±pH 7.

The thoroughly washed silica is suspended in 2 liters of methanol, stirred, permitted to settle and the supernatent liquor comprising leftover acidic water is decanted. The methanol washed silica is next suspended in 4 liters of acetone, stirred, permitted to settle and again the supernatent liquor is decanted. The settled silica is transferred to a flat pan type container, spread evenly, and covered with a finely perforated aluminum sheet to prevent escape of the silica under vacuum, the silica being dried under vacuum in a vacuum oven at 60° C. and 25 lbs. pressure on a pressure gauge for about 16 hours.

In a 5 liter flask 1.5 liters of toluene are warmed gently using a steam bath at 80° C. for 30 minutes. The hydrolyzed silica is then slowly added into the warm toluene to form a uniform suspension. The flask is then fitted with a 2-arm connector tube. A stirrer is inserted through one arm of the connector tube. The mixture is stirred while heating at 90° C. to 100° C. on a steam bath. The second arm of the connector tube is kept open. After one hour of heating, a water circulating condensor is attached to the open arm of the connector tube and heating is continued for an additional two hours on the steam bath at 90° C. to 100° C. After two hours the heat is turned off and the connector tube assembly is removed. Then 180 ml. of octadecyltrichlorosilane are gently added to the flask. The assembly is placed on the flask and the reaction mixture is heated for 15 hours with stirring at the reaction mixture temperature of 90° C. to 100° C. The assembly is then removed and the heat is turned off. The reaction mixture is then allowed to cool. Cooling can be acccelerated by running tap water over the flask. The solvent mixture is filtered off using a glass filter.

The silica is then suspended in 2 liters of toluene, stirred, and permitted to settle. The toluene is then decanted. The silica is again suspended in 2 liters of toluene, stirred, permitted to settle, and the toluene is decanted. The silica is then suspended in 2 liters of methanol, stirred, permitted to settle, and the supernatent liquor is decanted. The silica is washed by stirring with 2 liters of acetone. The silica is permitted to settle and the supernatent liquor is decanted. The settled silica is transferred to a flat pan type container, spread evenly and covered with a finely perforated aluminum sheet to prevent escape of the silica under vacuum. The silica is dried under vacuum in a vacuum oven at 60° C. and 25 lbs. pressure on a pressure gauge for about 16 hours.

Two liters of 50% aqueous acetonitrile (v/v) are transferred into a 5 liter round-bottom flask. The dried, silanized silica is added to the aqueous acetonitrile. The acetonitrile is gently swirled to form a uniform suspension. The suspension is stirred at room temperature for two hours, the silica is then permitted to settle and the aqueous acetonitrile is then decanted. The silica is then suspended in 5 liters of deionized water, stirred, settled, and the water is decanted. Then, the silica is suspended in 2 liters of acetone, stirred, permitted to settle, and the supernatent liquor is decanted. The silica is then transferred to a flat pan type container, spread evenly, and covered with a finely perforated aluminum sheet to prevent escape of the silica under vacuum. The silica is dried under vacuum in a vacuum oven at 60° C. and 25 lbs. pressure on a pressure gauge for about 16 hours. The silanized silica is ready for use.

The silanized silica is analyzed after block drying and the results of the analysis are:
C: 22.25
H: 3.79

EXAMPLE 2

Example 1 is repeated except 90 ml. of trimethylchlorosilane are substituted for the 180 ml. of octadecyltrichlorosilane. The silanized product is analyzed after block drying and the results obtained are:
C: 20.67
H: 3.58

EXAMPLE 3

Example 1 is repeated except 90 ml. instead of 180 ml. of octadecyltrichlorosilane are utilized. The silanized silica is analyzed after block drying and the results obtained are:
C: 19.18
H: 3.35

EXAMPLE 4

In this Example, the procedure of Example 1 is followed through the silanization step except the reaction temperatures are over 105° C.:

A mixture of 1000 ml. each of concentrated sulfuric acid and concentrated nitric acid are introduced in a 5 liter round bottom flask and permitted to cool. 500 grams of pure silica gel are slowly added to the concentrated acid mixture, and the flask is gently swirled until all the silica is properly suspended. A circulating water condensor is attached to the flask and the mixture is heated at a reaction mixture temperature of between 105–109° C. on a steam bath. Thereafter, the flask is removed from the steam bath and the mixture is permitted to cool. The cooled acid is run through a glass filter. The silica is suspended in 10 liters of deionized water, stirred and permitted to settle. The acidic water is decanted and the silica is washed ten consecutive times using 10 liters of deionized water each wash. The suspended silica is stirred and permitted to settle. The pH of the final wash is checked to make certain that its pH is approximately that of the deionized wash water; namely, about ±pH 7.

The thoroughly washed silica is suspended in 2 liters of methanol, stirred, permitted to settle and the supernatent liquor comprising leftover acidic water is decanted. The methanol washed silica is next suspended in 4 liters of acetone, stirred, permitted to settle and again the supernatent liquor is decanted. The settled silica is transferred to a flat pan type container, spread evenly, and covered with a finely perforated aluminum sheet to prevent escape of the silica under vacuum, the silica being dried under vacuum in a vacuum oven at 60° C. and 25 lbs. pressure on a pressure gauge for about 16 hours.

In a 5 liter flask 1.5 liters of toluene are warmed gently using a steam bath between 105° and 109° C. for 30 minutes. The hydrolyzed silica is then slowly added into the warm toluene to form a uniform suspension. The flask is then fitted with a 2-arm connector tube. A stirrer is inserted through one arm of the connector tube. The mixture is stirred while heating at between 105° C. and 109° C. on a steam bath. The second arm of the connector tube is kept open. After one hour of heating, a water circulating condensor is attached to the open arm of the connector tube and heating is continued for an additional two hours on the steam bath at between 105° and 109° C. After two hours the heat is turned off and the connector tube assembly is removed. Then 180 ml of octadecyltrichlorosilane are gently added to the flask. The assembly is placed on the flask and the reaction mixture is heated for 15 hours with stirring at the reaction mixture temperature of between 105° C. and 109° C. The assembly is then removed and the heat is turned off. The reaction mixture is then allowed to cool. Cooling can be accelerated by running tap water over the flask. The solvent mixture is filtered off using a glass filter.

The silica is then suspended in 2 liters of toluene, stirred, and permitted to settle. The toluene is then decanted. The silica is again suspended in 2 liters of toluene, stirred, permitted to settle, and the toluene is decanted. A portion of the silanized silica is block dried and then analyzed for carbon content. The results obtained are:

C: 16.01
H: 3.17
Moisture: 7.3%

To increase the carbon content, the silanized product is again silanized at reaction temperatures which do not exceed 100° C.:

In a 5 liter flask 1.5 liters of toluene are warmed gently using a steam bath at 80° C. for 30 minutes. The silanized silica is then slowly added into the warm toluene to form a uniform suspension. The flask is then fitted with a 2-arm connector tube. A stirrer is inserted through one arm of the connector tube. The mixture is stirred while heating at 90° C. to 100° C. on a steam bath. The second arm of the connector tube is kept open. After one hour of heating, a water circulating condensor is attached to the open arm of the connector tube and heating is continued for an additional two hours on the steam bath at 90° C. to 100° C. After two hours the heat is turned off and the connector tube assembly is removed. Then 90 ml of octadecyltrichlorosilane are gently added to the flask. The assembly is placed on the flask and the reaction mixture is heated for 15 hours with stirring at the reaction mixture temperature of 90° C. to 100° C. The assembly is then removed and the heat is turned off. The reaction mixture is then allowed to cool. Cooling can be accelerated by running tap water over the flask. The solvent mixture is filtered off using a glass filter.

The silica is then suspended in 2 liters of toluene, stirred, and permitted to settle. The toluene is then decanted. The silica is again suspended in 2 liters of toluene, stirred, permitted to settle, and the toluene is decanted. The silica is then suspended in 2 liters of methanol, stirred, permitted to settle, and the supernatent liquor is decanted. The silica is washed by stirring with 2 liters of acetone. The silica is permitted to settle and the supernatent liquor is decanted. The settled silica is transferred to a flat pan type container, spread evenly and covered with a finely perforated aluminum sheet to prevent escape of the silica under vacuum. The silica is dried under vacuum in a vacuum oven at 60° C. and 25 lbs. pressure on a pressure gauge for about 16 hours.

Two liters of 50% aqueous acetonitrile (v/v) are transferred into a 5 liter round-bottom flask. The dried, silanized silica is added to the aqueous acetonitrile. The acetonitrile is gently swirled to form a uniform suspension. The suspension is stirred at room temperature for two hours, the silica is then permitted to settle and the aqueous acetonitrile is then decanted. The silica is then suspended in 5 liters of deionized water, stirred, settled, and the water is decanted. Then, the silica is suspended in 2 liters of acetone, stirred, permitted to settle, and the supernatent liquor is decanted. The silica is then transferred to a flat pan type container, spread evenly, and covered with a finely perforated aluminum sheet to prevent escape of the silica under vacuum. The silica is dried under vacuum in a vacuum oven at 60° C. and 25 lbs. pressure on a pressure gauge for about 16 hours. The silanized silica is ready for use.

The silanized silica is analyzed after block drying and the results of the analysis are:

C: 20.3
H: 3.21
Moisture: 6.5%

I claim:

1. A method for making a 'reverse-phase' chromatographic packing having a carbon content of at least about 20% by weight comprising hydrolyzing silica gel by treating the silica gel with a mixture of sulfuric and nitric acids at a temperature which does not exceed 100° C., the strength of the acid mixture being sufficient to provide an exothermic reaction upon admixture with the silica gel, washing the treated silica gel to remove said acids, and drying the treated silica gel to maintain a water content of between about 5.5% to 9.5% water by weight of the silica gel, silanizing the hydrolyzed silica gel by: (a) reacting it with an alkylchlorosilane at a temperature which does not exceed 100° C., (b) washing the resulting product and (c) drying it to maintain a moisture content of between about 5.5% to 9.5% water by weight of the silica gel, and hydrolyzing the bonded chlorosilane to replace the chlorine atoms of the bonded chlorosilane with hydroxyl groups, washing the hydrolyzed product and then drying it, said carbon content being based upon the alkyl group of the bonded alkylchlorosilane.

2. A method as claimed in claim 1 wherein the alkylchlorosilane is a $C_1$ to $C_{18}$ alkyltrichlorosilane.

3. A method according to claim 1 wherein the alkylchlorosilane is octadecycltrichlorosilane or trimethylchlorosilane.

4. A method according to claim 1 wherein said mixture of acids is between about 40-60% by weight sulfuric acid and between about 40-60% by weight nitric acid, the total weight percentages adding up to 100%.

5. A method according to claim 1 wherein said mixture of acids is about 50% by weight concentrated sulfuric acid and about 50% by weight concentrated nitric acid.

6. A method according to claim 1 wherein each of said drying steps occurs under vacuum at a temperature of between 55° C. and 65° C.

7. A method according to claim 1 wherein said washing of the treated silica gel includes repeated washings with water having a pH of at least about 6 until the final wash solution has a pH substantially equal to the pH of the water prior to the washing step and then washing with a $C_1$ to $C_4$ alcohol.

8. A method according to claim 7 wherein said alcohol is methanol.

9. A method according to claim 1 wherein the washing during the acid hydrolysis and during the silanization include a methanol wash.

10. A method according to claim 1 wherein reaction (a) is repeated after washing step (b) to obtain a silanized silica having a carbon content of at least 20% by weight.

11. A method according to claim 1 wherein a water content of between 7.5% and 8.5% by weight of the silica gel is maintained prior to hydrolyzing the bonded chlorosilane.

12. A method as claimed in claim 1 wherein the nitric acid is concentrated nitric acid and the sulfuric acid is concentrated sulfuric acid.

* * * * *